United States Patent Office 2,983,772
Patented May 9, 1961

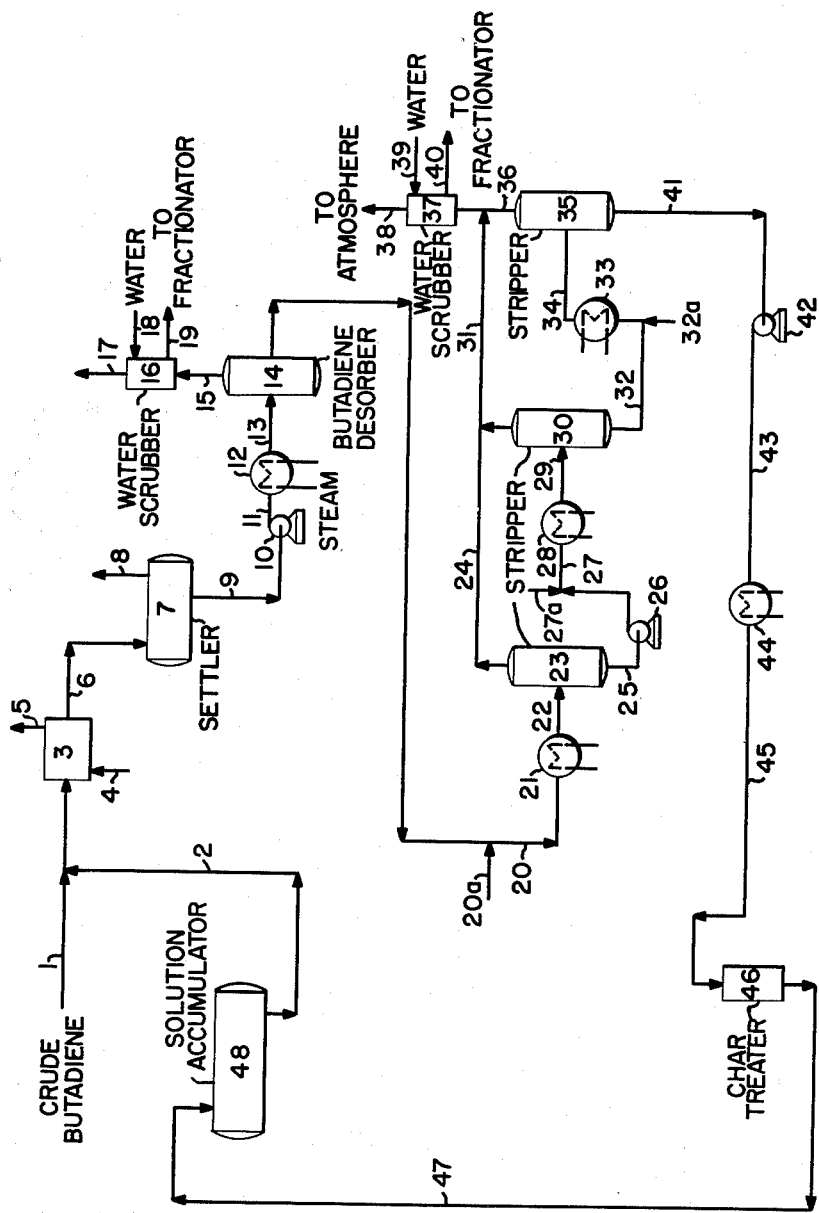

2,983,772
APPLICATION OF FLASH STRIPPING STAGES TO CAA ACETYLENE REMOVAL PROCESS

Willim Ray Mooneyhan, John Taylor Roberts, Samuel Winfield Wilson, and Robert Wayne MacDonald, all of Baton Rouge, La., assignors to Esso Research and Engineering Company, a corporation of Delaware Filed May 20, 1959, Ser. No. 814,488

4 Claims. (Cl. 260—681.5)

The present invention relates to an improved cuprous ammonium acetate pretreat process utilized to remove acetylenes from $C_4$ hydrocarbon streams prior to extraction of butadiene therefrom. More particularly, this invention relates to the selective removal of these acetylenes from the butadiene extraction feed by prewashing with cuprous ammonium acetate solution followed by desorbing and stripping the acetylenes from said solution in successive high pressure followed by low pressure flash vaporization stages. Most particularly, this invention relates to the use of flash vaporization stages, first at high pressure and low temperature to selectively desorb mainly butadiene, and then in successive stages at lower pressures and higher temperatures to strip acetylenes from the wash solution. Additionally, removal of both of these is obtained at minimum residence times thereby reducing acetylene polymer formation. Thus, in this process not only is butadiene selectively desorbed and recovered but also less polymer formation is obtained due to stripping either at lower temperatures or for shorter periods of time.

Pretreat processes for removing acetylenes from butadiene extraction feed streams are made necessary since acetylenes are absorbed (by the cuprous ammonium acetate (CAA) solution used in butadiene extraction units) more strongly than butadiene and thus are not completely desorbed during the desorption of butadiene; however, sufficient acetylenes are desorbed to cause excessive acetylenes in the butadiene product on occasion. Incomplete acetylene desorption causes a buildup of acetylenes in the solvent solution. These acetylenes polymerize and the resultant polymers cause foaming of the solvent solution, emulsification of hydrocarbons in the solution, buildup of polymer-emulsion layers at settler interfaces and deposition of solid polymers in piping and equipment, all of which detrimentally affect the absorption capacity and selectivity of the solvent solution. Reduced absorption capacity and selectivity result in lower butadiene recovery. Therefore, in the commercial extraction of butadiene using aqueous cuprous ammonium acetate solution, it is highly desirable that acetylenes be removed from the hydrocarbon feed before it enters the butadiene extraction unit absorption train.

Acetylenes are selectively removed from butadiene extraction system feeds by prewashing with a relatively small amount of CAA solution, followed by desorbing and stripping the acetylenes from the solution to the atmosphere or to a flare. In the acetylene removal desorption operation, the solution must be stripped essentially free of acetylenes to prevent or minimize plugging and fouling of the system caused by polymer formation and to maintain satisfactory acetylene absorption capacity of the solution. Thus, the temperature of the solution is usually raised to 200° F. and above to adequately strip acetylenes. At these high temperatures, copper acetylide polymerizes very rapidly, consequently this operation is plagued with a very low service factor and with the expense of excessive char treating to remove the polymer formed in the stripping operation. Additionally, some butadiene is absorbed by the solution along with acetylenes. This butadiene is lost since it has been difficult in conventional packed towers to selectively desorb the butadiene free enough from acetylenes for recovery while getting satisfactory acetylene desorption from the solution. It has now been discovered that a considerable saving can be realized by recovering this butadiene and at the same time effecting a reduction in the amount of polymer formation by utilizing the present invention pretreat system.

The present invention pretreat process provides for the use of successive flash vaporization stages to selectively desorb butadiene and to strip acetylenes from the solution with minimum polymer formation. Multiple stages, the essence of this invention, are needed because the chemical reaction whereby copper acetylides revert to cuprous ion and free acetylenes, requires (1) a finite time for completeness of reaction, and (2) continuous removal of the resultant acetylene vapors to permit completeness of reaction. Neither of these essential elements can be effectively controlled in the conventional single stage stripping operation, nor can excessive polymer formation be avoided. The use of these present invention flash stages (1) provides adequate or improved acetylene stripping, (2) reduces polymer formation, thus increasing the service factor of the unit and decreasing char treat costs, and (3) additionally, permits recovery of absorbed butadiene.

The cuprous ammonium acetate pretreat solution is prepared by reacting ammonia-ammonium acetate solution with copper shot in a tower together with a controlled amount of air. The composition of the cuprous ammonium acetate solution used in the acetylene removal system is maintained within the following range for best efficiency:

| Component | Moles/liter | | |
|---|---|---|---|
| | Minimum | Maximum | Preferred |
| Cupric ion | 0.2 | 0.6 | 0.4 |
| Cuprous ion | 2.0 | 2.7 | 2.7 |
| Acetate ion | 5.5 | 6.5 | 6.0 |
| Ammonia | 9.5 | 11.5 | 10.6 |

Treating weight ratios of cuprous ammonium acetate solution to $C_4$ feed should be in the range of 1/1.5 to 1/2.2, preferably 1/2.0. Treating temperatures should be in the range of 40° F. to 50° F., preferably 45° F., pressures 80 p.s.i.g. to 100 p.s.i.g., preferably 90 p.s.i.g., and contacting times in the range of 20 min. to 30 min., preferably 25 min.

The present invention acetylene removal system is shown in the attached schematic flow plan in the figure. The crude butadiene bearing $C_4$ hydrocarbon stream is passed through line 1 together with recycued lean cuprous ammonium acetate solution supplied through line 2 to chiller 3. Liquid propylene is supplied through line 4 to this chiller to supply refrigeration and gaseous propylene is removed through line 5. From the chiller the combined stream is passed through line 6 to settler 7 where the treated butadiene is taken overhead through line 8. This hydrocarbon with 85-95 wt. percent of the acetylenes removed, is passed on to the butadiene extraction system (not shown) for further processing. The acetylene rich cuprous ammonium acetate solution from the settler is passed through line 9 to pump 10 where its pressure is increased to about 180 to 195 p.s.i.g. Thence through line 11 it is passed to heater 12 where the temperature is raised to 100° F. to 120° F., preferably 110° F. The warm solution is then passed through line 13 to butadiene desorber flash drum 14 where the solution is flashed to a pressure of 45 to 55 p.s.i.g., preferably 50 p.s.i.g. Here the small amounts of butadiene absorbed in the solution are selectively desorbed. This butadiene flashed overhead through line 15 is then water scrubbed in scrubber 16 to remove ammonia and the butadiene is recovered through line 17. The water is supplied to the scrubber through line 18 and is removed from the scrubber through line 19. From the butadiene desorber flash drum, the cuprous ammonium acetate solution is passed through line 20 to heater 21 where its temperature is raised to 180 to 190° F., preferably 185° F. Liquid or vapor $NH_3$ is injected thru line 20A equivalent to about 0.3 mol/liter of solution to replace $NH_3$ lost previously in the process. The material is then passed through line 22 and is flashed in stripper 23 to a pressure of 25 to 35 p.s.i.g., preferably 30 p.s.i.g. Some of the acetylenes are desorbed overhead through line 24 and the cuprous ammonium acetate solution is passed through line 25 to pump 26 and through line 27 to heater 28 where its temperature is raised again to 180 to 190° F., preferably 185° F. Thence the stream is passed through line 29 and is again flashed in stripper 30 to a pressure of 25 to 35 p.s.i.g., preferably 30 p.s.i.g. Liquid or vapor $NH_3$ is injected thru line 27A at a rate equivalent to about 0.3 mol/liter of solvent. More of the acetylenes are taken overhead through line 31 and the cuprous ammonium acetate solution is passed through line 32 to heater 33 where its temperature is raised to 195° F. to 205° F., preferably 200° F. Thence the solution is passed through line 34 to be flashed in the last stripper 35 to a pressure of 3 to 10 p.s.i.g., preferably 5 p.s.i.g. Liquid or vapor $NH_3$ is injected thru line 32A at a rate equivalent to about 0.3 mol/liter of solvent. Acetylenes are again taken overhead through line 36 where the are joined by the acetylenes removed in strippers 23 and 30 supplied through lines 24 and 31 and are passed to water scrubber 37. Here ammonia is removed and the acetylenes are passed to the atmosphere through line 38. Water is supplied through line 39 and is removed through line 40. From the bottom of stripper 35, cuprous ammonium acetate solution, essentially free of acetylenes, is passed through line 41, pump 42 and line 43 to cooler 44 where its temperature is reduced to 90° F. to 110° F., preferably 100° F. It is then passed through line 45 to char treater 46 for the removal of small amounts of acetylene polymers. Cuprous ammonium acetate solution ready for recycle is then passed through line 47 to solution accumulator 48 and thence through line 2 to the process as previously described.

*Example 1*

The following data were obtained in a system as described above and as represented in the figure.

| | Temp., °F. | Pressure, p.s.i.g. | Butadiene, Percent Removed | Acetylene, Percent Removed | Butadiene, Percent Recovered |
|---|---|---|---|---|---|
| Drum 14 | 110 | 50 | 80 | 10 | 80 |
| Drum 23 | 185 | 35 | | 40 | |
| Drum 30 [1] | | | | | |
| Drum 35 | 200 | 5 | | 45 | |
| | | | | 95 | |

CAA solution circulation rate—.5# CAA/# $C_4$ feed.
Average char life with this invention—30 days.
Service factor of unit—95%.
[1] It was found in operating at fairly low throughput rates that only two stripping stages were necessary to satisfactorily remove acetylene.

*Example 2*

Operating data from conventional, packed tower system (prior art operation):

| | Temp., °F. | Pressure, p.s.i.g. | Butadiene, Percent Removed | Acetylene, Percent Removed | Butadiene, Percent Recovered |
|---|---|---|---|---|---|
| First Tower | 180 | 20 | 80 | 40 | [1] 0 |
| Second Tower | 205 | 5 | | 30 | |
| | | | | 70 | |

CAA solution circulation rate—.5# CAA/# $C_4$ feed.
Average char life—12 days.
Service factor of unit—80%.
[1] Butadiene unrecoverable because of high acetylene content.

What is claimed is:

1. In a cuprous ammonium acetate pretreat process for the removal of acetylenes from butadiene rich $C_4$ streams, the improvement which comprises desorbing the acetylenes and small amounts of butadiene from the spent cuprous ammonium acetate solution in a series of three flash vaporization stages with a minimum residence time in each stage, the first flash vaporization stage being operated at pressures of 45 to 55 p.s.i.g. and temperatures of 100° F. to 130° F., the second stage being operated at pressures of 25 to 35 p.s.i.g. and temperatures of 180° F. to 190° F. and the third stage being operated at pressures of 3 to 10 p.s.i.g. and temperatures of 195° F. to 205° F. with interstage $NH_3$ injection.

2. The process of claim 1 in which butadiene substantially free from acetylenes is recovered from the first flash vaporization stage.

3. The process of claim 1 in which the cuprous ammonium acetate solution composition in mols/liter is maintained within the following ranges; cupric ion 0.4, cuprous ion 2.7, acetate ion 6.0 and ammonia 10.6.

4. In a cuprous ammonium acetate pretreat process for the removal of acetylenes from $C_4$ butadiene rich streams the improvement which comprises desorbing the small amounts of butadiene present in the spent cuprous ammonium acetate solution substantially free from the acetylenes in a first flash vaporization stage operated at pressures of 45 to 55 p.s.i.g. and temperatures of 100 to 120° F. and removing acetylenes in each of a second flash vaporization stage operated at pressures of 25 to 35 p.s.i.g. and temperatures of 180 to 190° F., a third flash vaporization stage operated at pressures of 25 to 35 p.s.i.g. and temperatures of 180 to 190° F. and a fourth flash vaporization stage operated at pressures of 3 to 10 p.s.i.g. and temperatures of 195 to 205° F., with interstage injection of $NH_3$.

References Cited in the file of this patent

UNITED STATES PATENTS

| | | |
|---|---|---|
| 2,144,692 | Schuftan | Jan. 24, 1939 |
| 2,788,378 | Cotton et al. | Apr. 9, 1957 |